July 4, 1961 J. R. ELWELL 2,991,068
HYDROPNEUMATIC SUSPENSION
Filed Aug. 27, 1958 2 Sheets-Sheet 1
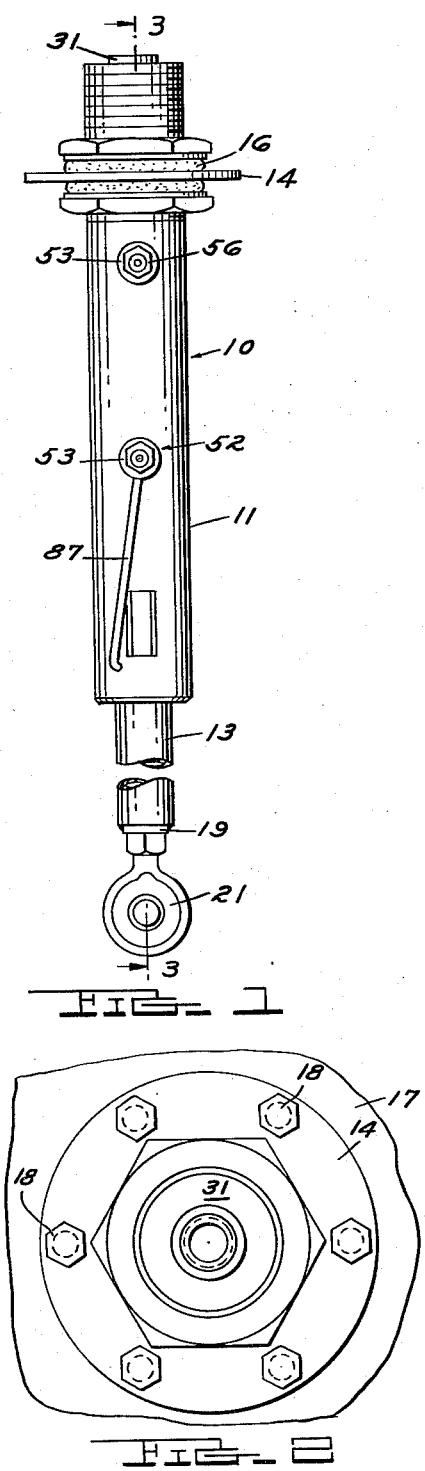
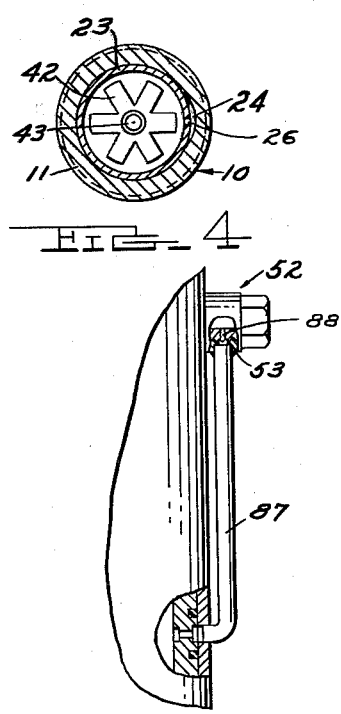
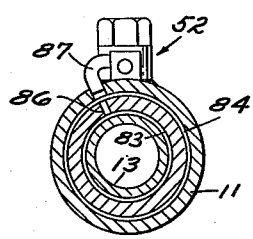
J. R. ELWELL
INVENTOR.
BY E. C. McRAE
J. R. FAULKNER
T. H. OSTER
ATTORNEYS

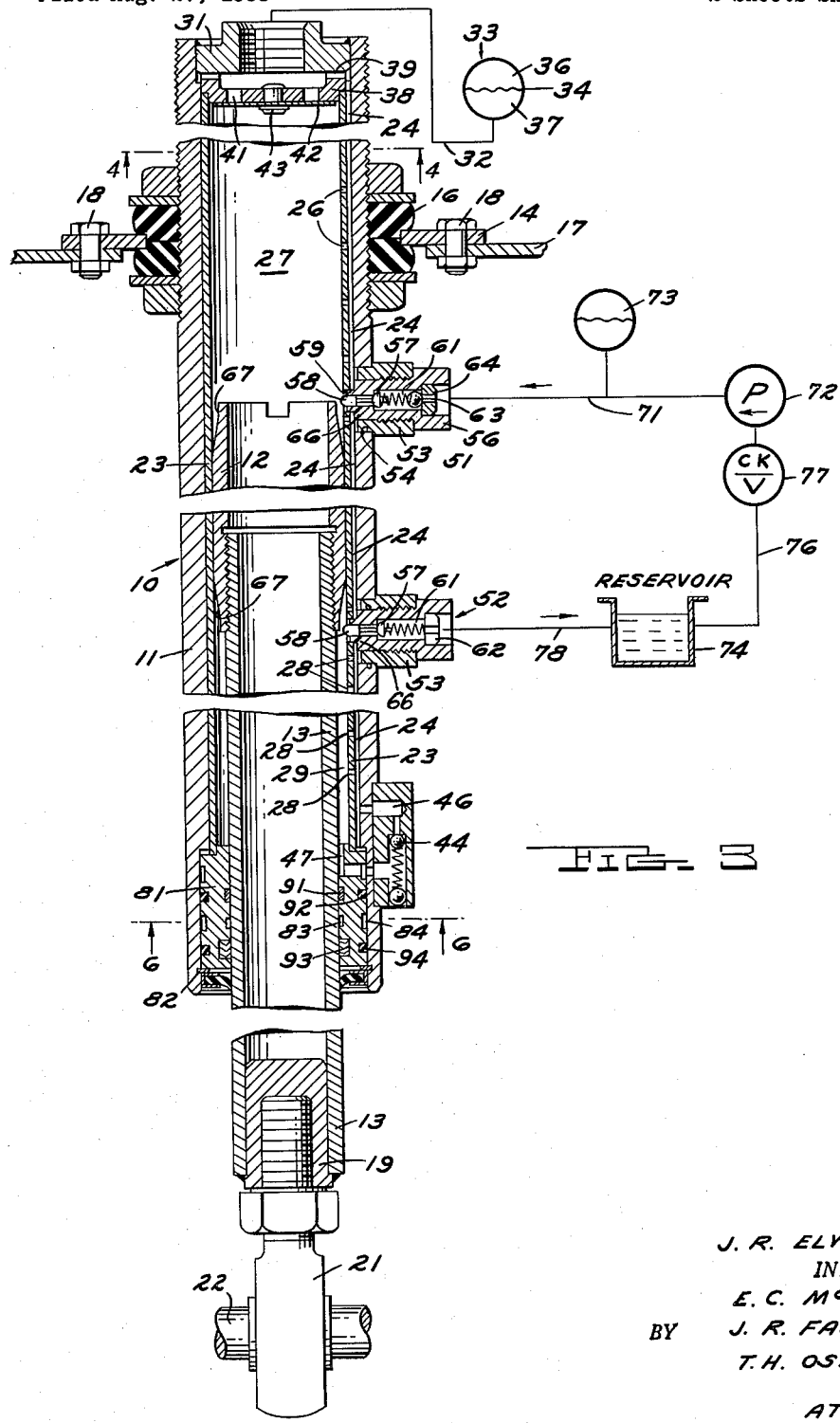

United States Patent Office 2,991,068
Patented July 4, 1961

2,991,068
HYDROPNEUMATIC SUSPENSION
John R. Elwell, Dearborn, Mich., assignor to Ford Motor Company, Dearborn, Mich., a corporation of Delaware
Filed Aug. 27, 1958, Ser. No. 757,471
7 Claims. (Cl. 267—64)

This invention relates to motor vehicle suspensions and more particularly to a hydropneumatic suspension for a motor vehicle.

An object of the present invention is to provide a motor vehicle suspension utilizing a variable volume gas filled chamber as the spring medium in combination with a telescopic hydraulic strut incorporating leveling mechanism for restoring the normal riding height of the vehicle when changes are made in the loading on the vehicle. This is accomplished in the present invention by a unit which is relatively inexpensive to manufacture and assemble, and which incorporates a minimum number of accurately machined parts. The telescopic strut of the present invention also performs the function of a shock absorber, and incorporates damping means varying with the length of stroke and providing a hydraulic stop at full stroke.

Other objects and advantages of this invention will be made more apparent as this description proceeds, particularly when considered in connection with the accompanying drawings, wherein:

FIGURE 1 is a side elevational view of a telescopic strut incorporating the present invention;

FIGURE 2 is a top plan view of the structure shown in FIGURE 1;

FIGURE 3 is an enlarged cross sectional view on the line 3—3 of FIGURE 1, and showing part of the suspension in diagrammatic fashion;

FIGURE 4 is a cross section on the line 4—4 of FIGURE 3;

FIGURE 5 is an enlarged fragmentary elevational view, partly in section, of the structure shown in FIGURE 1;

FIGURE 6 is a cross sectional view on the line 6—6 of FIGURES 3 and 5.

Referring now to the drawings, and particularly to FIGURES 1 and 3, the reference character 10 indicates generally a telescopic strut including a cylinder 11, piston 12 and piston rod 13. A circular mounting plate 14 is secured to the upper end of cylinder 11 by means of a rubber mounting 16, and is supported upon a structural body member 17, being secured thereto by bolts 18. The suspension is particularly adapted for use in connection with a unit body-frame type of vehicle, and the body member 17 may comprise part of the structural body support adjacent the wheel locations. In the case of a frame type construction, it could comprise a frame mounted bracket.

The lower end of the piston rod 13 is welded to a sleeve 19 receiving a supporting member 21 which may be in the form of an eye for pivotal or universal connection to a stub shaft 22 carried by the lower suspension arm (not shown).

A sleeve 23 is freely fitted within the cylinder 11. As best seen in FIGURE 4, the internal wall of the cylinder 11 is formed with an arcuate groove 24 cooperating with the sleeve 23 to provide a fluid passageway extending substantially the entire length of the cylinder along one side thereof. A series of axially spaced ports 26 are formed in the upper end of the sleeve 23 and establish communication between the groove 24 and the jounce control chamber 27 above the piston. A second series of axially spaced ports 28 are provided in the lower end of the sleeve 23 and establish communication between the groove 24 and an annular rebound control chamber 29 located between the sleeve 23 and the piston rod 13. It will be noted that during wheel jounce movement the piston 12 moves upwardly in the sleeve 23 and successively closes the series of ports 26 to provide a progressive damping action and finally a hydraulic stop. Similarly, during wheel rebound movement the piston 12 moves downwardly in the sleeve 23 and progressively closes the ports 28.

The upper end of the cylinder 11 is closed by an end cap 31 welded or brazed in place, and connected (as shown diagrammatically in FIGURE 3) by means of a liquid conduit 32 to an accumulator 33. The accumulator 33 is divided by means of a flexible diaphragm 34 into an upper gas chamber 36 and a lower liquid chamber 37. The upper chamber 36 is filled with nitrogen or other suitable gas, and forms a variable volume chamber acting as a spring medium for the suspension.

The lower chamber 37 of the accumulator 33 communicates through the conduit 32 and the end cap 31 with the upper end of the cylinder 11. A valve plate 38 is located in the upper end of the cylinder between the sleeve 23 and the end cap 31. The port 39 in the side wall of the valve plate 38 provides constant fluid communication between the fluid filled lower chamber 37 of the accumulator and the cylinder groove 24. A series of angularly spaced axial ports 41 are provided in the valve plate 38, and are normally held closed by a spider shaped valve spring 42 secured to the plate by means of a rivet 43. During wheel rebound, the piston 12 moves downwardly increasing the size of the chamber 27, and replenishing fluid from the accumulator 33 enters the chamber through the ports 41 and past the valve spring 42.

The reference character 44 indicates a replenishing valve mounted adjacent the lower part of the cylinder 11 and arranged to admit replenishing fluid into the annular chamber 29 between the piston rod 13 and the sleeve 23 during wheel jounce. This replenishing fluid is supplied from the cylinder groove 24 through passage 46, check valve 44 and passage 47 to the chamber 29.

Intake and exhaust leveling valves 51 and 52 are provided to maintain the vehicle at a constant riding height. The valve housings are similar, each housing 53 being inserted into an opening in the opening 54 in the side wall of the cylinder 11, and welded thereto. A hollow plug 56 is threaded into each housing 53 and carries a poppet valve 57 having a valve stem 58 projecting through an opening 59 in the sleeve 53 and into the interior of the sleeve 23. The poppet valve 57 is normally held closed by a spring 61. In the case of the exhaust valve 52, the spring 61 seats against a hollow plug 62, while in the case of the supply valve 51 the spring seats against a ball check valve 63 which in turn seats against a hollow plug 64.

Diagonal passages 66 are provided in the hollow plugs 56 of the intake and exhaust valves 51 and 52 and communicate with the axial groove 24 in the cylinder 11 when the valves 57 are unseated. Unseating of the valves occurs by engagement of the opposite ends of the piston 12 with the valve stems 58 projecting into the interior of the sleeve 23. Each end of the piston 12 is formed with a tapered end ramp 67 to provide a gradual opening of the respective valve as the piston moves within the sleeve.

The intake leveling valve 51 is connected (as shown diagrammatically in FIGURE 3) by a conduit 71 to a fluid pump 72 or other source of fluid pressure. An accumulator 73 is connected to the conduit 71 to provide a reserve supply of fluid under pressure. The fluid pump 72 is supplied from a reservoir 74 through a conduit 76 and a check valve 77. The reservoir 74 in turn is connected by conduit 78 to the exhaust leveling valve 52.

The leveling valves 51 and 52 function to maintain the vehicle at a constant riding height. As the load on the vehicle is increased the cylinder 11 moves downwardly under the added load causing the valve stem 58 of the intake valve 51 to be engaged by the upper tapered end 67 of the piston 12. This opens poppet valve 57 and permits fluid under pressure from the pump 72 or accumulator 73 to flow through the passages 66 into the axial groove 24 in the cylinder. The increased supply of fluid enters the upper chamber 27 of the cylinder partially through the ports 26 in the wall of the sleeve 23 and also through the ports 41 in the valve plate 38, thus raising the vehicle to its normal height, at which time the poppet valve 57 is closed by the spring 61.

In similar fashion, a decrease in the load on the vehicle causes the cylinder 11 to move upwardly until the valve stem 58 of the exhaust leveling valve 52 is actuated by the lower tapered end 67 of the piston 12. Fluid is then exhausted from the strut through the exhaust leveling valve 52 to the reservoir 74, thus restoring the vehicle to its normal riding height.

During normal wheel jounce and rebound occurring when the vehicle is operating over irregular road surfaces, the intake and exhaust leveling valves 51 and 52 will be intermittently opened and closed. However, the duration will be too short to materially effect the leveling position of the suspension and there is a tendency for the intake and exhaust of fluid to be equalized. Any unbalance will, of course, be automatically corrected.

As previously mentioned, the axially spaced ports 26 and 28 in the upper and lower portions of the sleeve 23 will be progressively covered by the piston 12 during wheel jounce and wheel rebound respectively. As each port is closed the total remaining port area is decreased, adding damping effect. The final port is closed just before the piston reaches its full stroke to provide a hydraulic stop and to eliminate the need for rubber suspension stops. The telescopic strut 10 thus functions as a shock absorber in addition to its suspension and leveling functions, and eliminates the need for separate shock absorbers.

With reference now to the lower portion of FIGURE 3, it will be seen that an end cap 81 closes the lower end of the cylinder 11, being seated upon a retaining ring 82. Inner and outer annular grooves 83 and 84 are formed in the end cap 81 and, as shown in FIGURE 6, are interconnected by a radial port 86, and then connected by means of a tube 87 to a port 88 formed in the side wall of the housing 53 of the exhaust leveling valve 52. The tube 87 forms a return for fluid which may leak past high pressure seals 91 and 92 provided in the end cap 81. Low pressure seal 93 and 94 are provided on the opposite side of the grooves 83 and 84 in the end cap.

It will be noted that the hydropneumatic suspension unit discussed above has a minimum number of parts requiring accurate machining and close tolerances. The sleeve forms the bearing surface for the piston 12 while the cylinder 11 forms a structural support for the unit. It will also be seen that the constructions at the upper and lower ends of the cylinder are such as to eliminate the need for close tolerances. Likewise, the intake and exhaust valves are of relatively inexpensive and trouble-free construction.

It will be understood that the invention is not to be limited to the exact constructions shown and described, but that various changes and modifications may be made without departing from the spirit and scope of the invention, as defined in the appended claims.

What is claimed is:

1. In a hydropneumatic wheel suspension for a motor vehicle having sprung and unsprung structures, a cylinder connected to one of said structures, a sleeve in said cylinder, an axially extending fluid passageway between said cylinder and said sleeve at one side thereof, a differential area piston slidably mounted in said sleeve, a piston rod for said piston connected to the other of said structures, a variable volume gas chamber located remotely from said cylinder and in communication through a liquid column with the interior of said sleeve and with said passageway and forming a spring medium for said motor vehicle wheel suspension, a source of pressure liquid communicating with an intake valve mounted upon said cylinder adjacent said passageway, said intake valve having an actuatable part extending into said sleeve in the path of said piston to be actuated upon movement of said piston in the wheel jounce direction to admit liquid from said source to said passageway, and an exhaust valve mounted upon said cylinder in axially spaced relationship to said intake valve and having an actuatable part extending into said sleeve in the path of said piston to be actuated upon movement of said piston in the wheel rebound direction to exhaust liquid from said passageway.

2. The structure defined by claim 1 which is further characterized in that said piston is a hollow sleeve having tapered ramps formed on its outer surface adjacent each end for engagement with the actuatable parts of said intake and exhaust valves, said piston rod also being a hollow sleeve of smaller diameter than said piston and secured to the interior of said piston.

3. The structure defined by claim 1 which is further characterized in that said cylinder has jounce and rebound fluid cambers therein, one of said chambers being cylindrical and located axially between said piston and the end of said cylinder and the other of said chambers being annular and located radially between said piston rod and said sleeve, passage means establishing communication between said chambers and said passageway between said cylinder and sleeve, and replenishing valves in said passage means opening toward said chambers.

4. The structure defined by claim 3 which is further characterized in that said sleeve has a series of axially spaced orifices in its side wall between said jounce and rebound chambers and said passageway adapted to be progressively closed by said piston when the latter moves in jounce and rebound.

5. In a hydropneumatic wheel suspension for a motor vehicle having sprung and unsprung structures, a cylinder connected to one of said structures, said cylinder having an axially extending passage at one side thereof, said passage comprising a groove formed in the internal wall of said cylinder, a differential area piston connected to the other of said structures and reciprocable within said cylinder, means interconnecting said passage and said cylinder on opposite sides of said piston, a variable volume gas chamber located remotely from said cylinder and having fluid communication through a liquid column with said interconnected cylinder and passage and forming a spring medium for said vehicle wheel suspension, a first valve and a source of pressure liquid in communication therewith, a liquid reservoir, said first valve controlling the flow of liquid from said source to said passage, a second valve communicating with said reservoir and controlling the flow of liquid from said passage to said reservoir, said valves being mounted upon said cylinder in axially spaced relationship and communicating with said passage, and actuating means for each of said valves projecting into said cylinder for engagement by said piston means to selectively open said valves.

6. In a hydropneumatic wheel suspension for a motor vehicle having sprung and unsprung structures, a cylinder connected to one of said structures, said cylinder having an axially extending passage at one side thereof, a differential area piston connected to the other of said structures and reciprocable within said cylinder, a plurality of ports interconnecting said passage and said cylinder on opposite sides of said piston, a variable volume gas chamber communicating with said cylinder and forming a spring medium for said vehicle suspension, an inlet valve and a source of pressure liquid in communication therewith, a liquid reservoir, said inlet valve controlling the flow of liquid from said source to said passage, an outlet valve communicating with said reservoir and controlling the flow of liquid from said passage to said reservoir, and means associated with said piston for selectively opening said inlet and outlet valves upon a predetermined relative movement between said piston and said cylinder in either direction.

7. The combination of claim 6 which is further characterized in that said passage comprises an axial groove formed in the internal wall of said cylinder, a sleeve in said cylinder cooperating with said groove to form an enclosed passage between said cylinder and said sleeve, said piston being slidably mounted in said sleeve, said plurality of ports being located in said sleeve, said ports establishing communication between said groove and the interior of said sleeve and being adapted to be progressively covered by said piston when it reciprocates.

References Cited in the file of this patent

UNITED STATES PATENTS

| | | |
|---|---|---|
| 1,861,821 | Schaum | June 7, 1932 |
| 2,241,826 | Rabe | May 13, 1941 |
| 2,642,278 | Westcott | June 16, 1953 |
| 2,653,021 | Lucien | Sept. 22, 1953 |
| 2,753,730 | Ashton et al. | July 10, 1956 |
| 2,756,046 | Lucien | July 24, 1956 |

FOREIGN PATENTS

| | | |
|---|---|---|
| 945,674 | Germany | July 12, 1956 |